Feb. 28, 1956

H. A. TOOKER 2,736,862

ARTICLE TESTING APPARATUS

Filed Nov. 27, 1951

INVENTOR
H. A. TOOKER
BY
W.C.Parnell
ATTORNEY

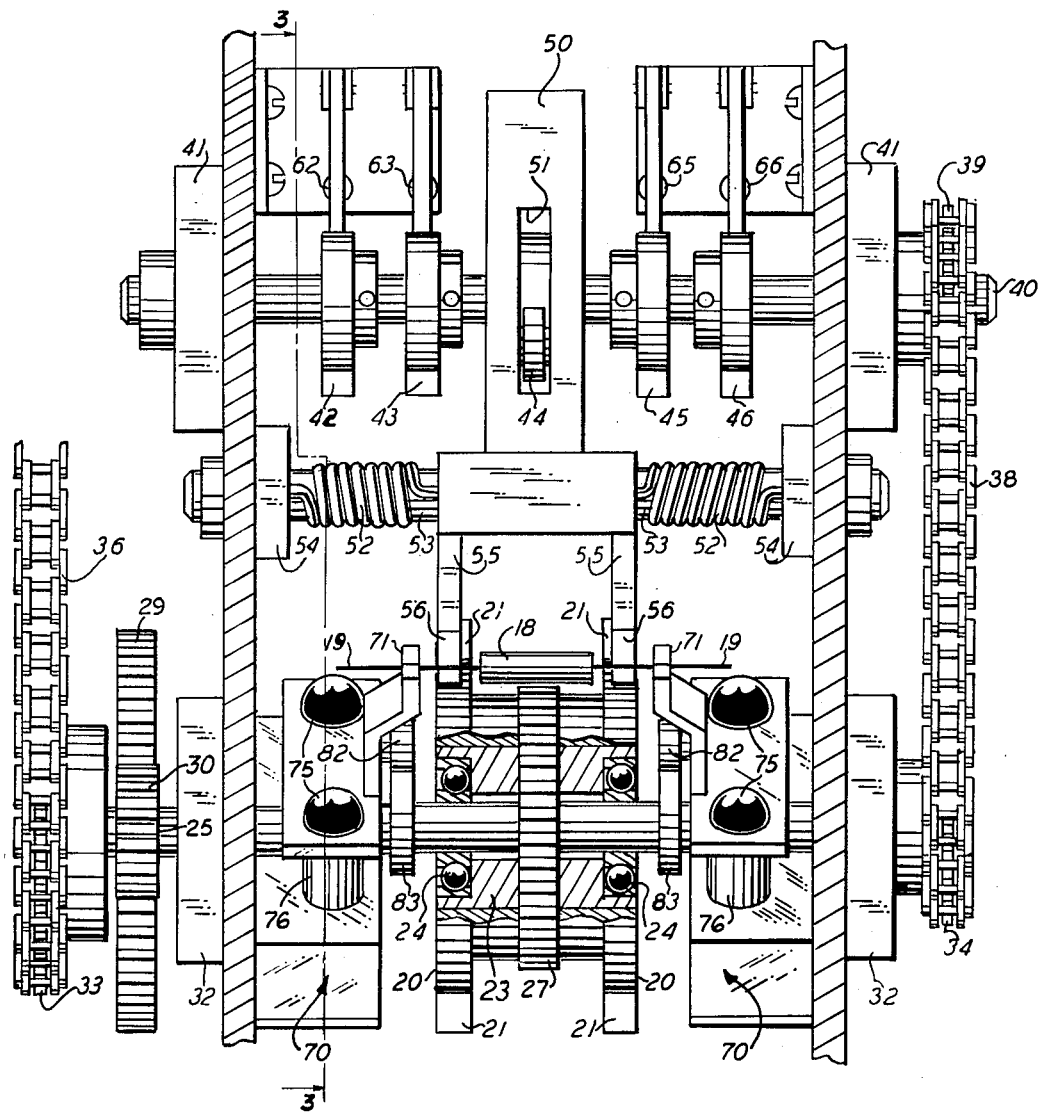

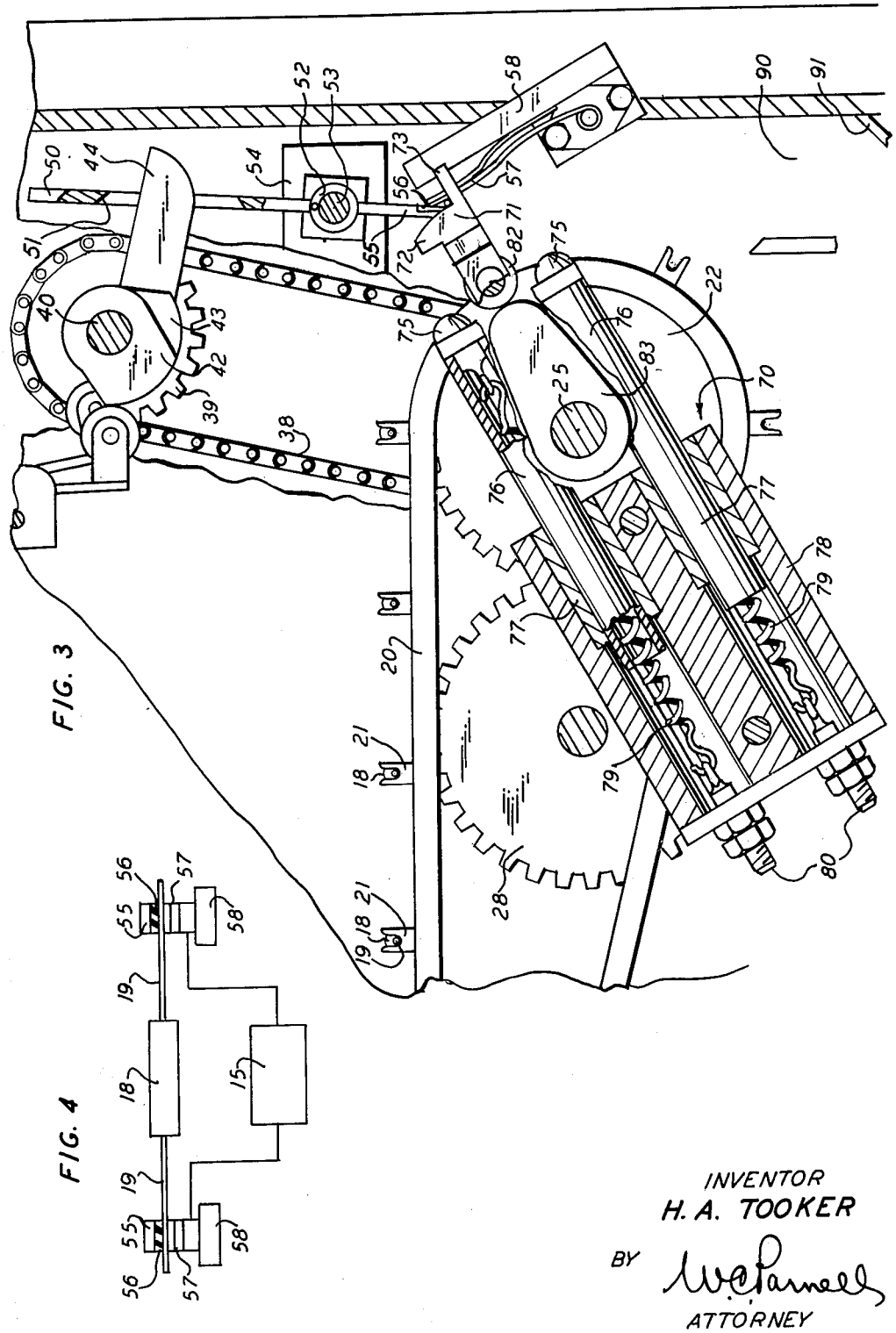

Feb. 28, 1956 H. A. TOOKER 2,736,862
ARTICLE TESTING APPARATUS
Filed Nov. 27, 1951 4 Sheets-Sheet 4

INVENTOR
H. A. TOOKER
BY
ATTORNEY

United States Patent Office 2,736,862
Patented Feb. 28, 1956

2,736,862

ARTICLE TESTING APPARATUS

Howard A. Tooker, Allentown, Pa., assignor to Western Electric Company, Incorporated, New York, N. Y., a corporation of New York Application November 27, 1951, Serial No. 258,483

7 Claims. (Cl. 324—158)

This invention relates to apparatus for use in testing electrical articles such as impedance elements and classifying them in accordance with the results of the test.

In large scale manufacture of electrical impedance elements such as coils, condensers, resistors or networks composed of such elements it is, of course, impracticable to make each such element so that it will have precisely a required value of inductance, capacitance, resistance or total impedance. It therefore is common practice to test these elements and segregate them into groups depending on whether each element is within acceptable limits or above or below such limits.

The object of this invention is an apparatus for use in testing these elements automatically in rapid succession and segregating the elements into two or more groups according to the results of the test.

According to the general features of the invention the apparatus comprises contacts included in a testing circuit and mounted at spaced positions near the path of travel of the electrical units so that an actuable element may successively engage the terminals or leads of the units and move them into engagement with their respective contacts to include the units singly in the testing circuit.

More specifically, the apparatus includes two conveyor belts driven at the same speed with equally spaced notched supports for the terminals of the electrical units. A transfer unit, operated in timed relation with the movement of the conveyor belts under the control of a cam, moves the successive electrical units toward the contacts so that the element, when actuated, may firmly hold the terminals in intimate engagement with the contacts for a length of time sufficient for the completion of the tests. When the tests have been completed the electrical units are released through actuation of the element and allowed to drop into any one of a plurality of containers depending upon the results of the tests.

Other objects and advantages will be apparent from the following detailed description when considered in conjunction with the accompanying drawings wherein:

Fig. 2 is a vertical sectional view of the apparatus portions thereof being shown in section;

Fig. 3 is a fragmentary sectional view, taken substantially along the line 3—3 of Fig. 2, illustrating the operated positions of the transfer member and the holding element;

Fig. 4 is a fragmentary sectional view of the legs of the holding element illustrating an electrical unit included in the test circuit;

Figure 1:
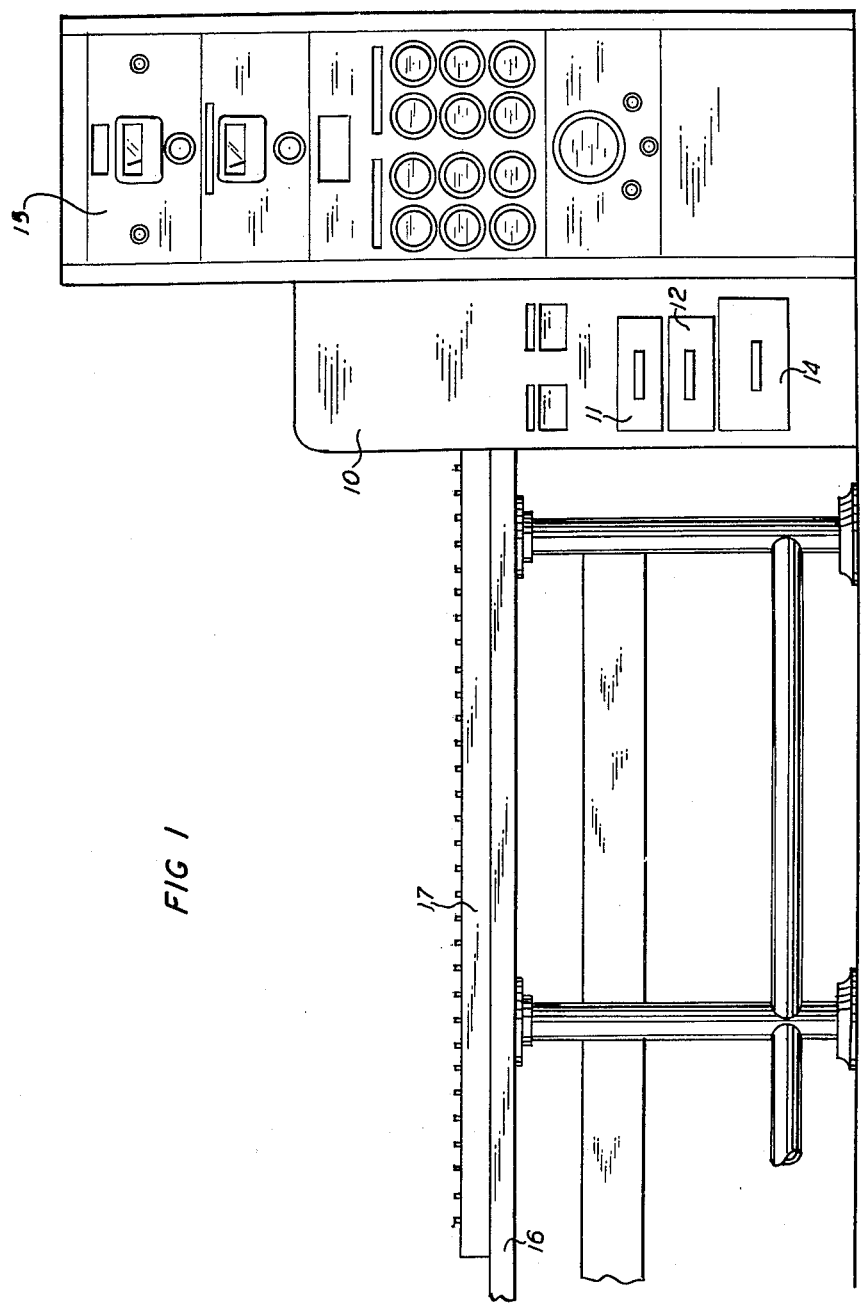
Fig. 1 is a front elevational view of the apparatus and the associated test set.
Figure 5:
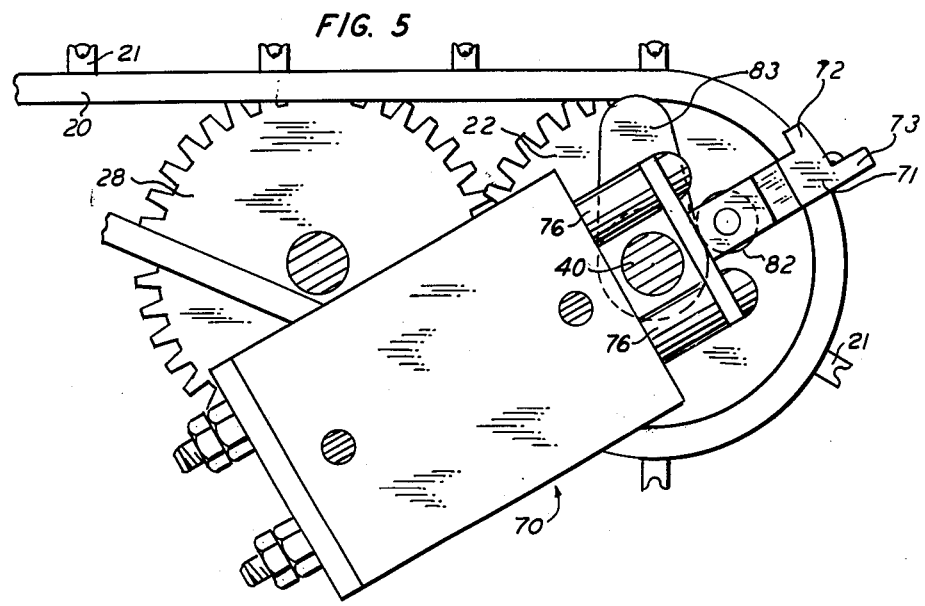
Fig. 5 is a fragmentary front elevational view of a portion of the apparatus illustrating the transfer member in its normal unoperated position.
Figure 6:
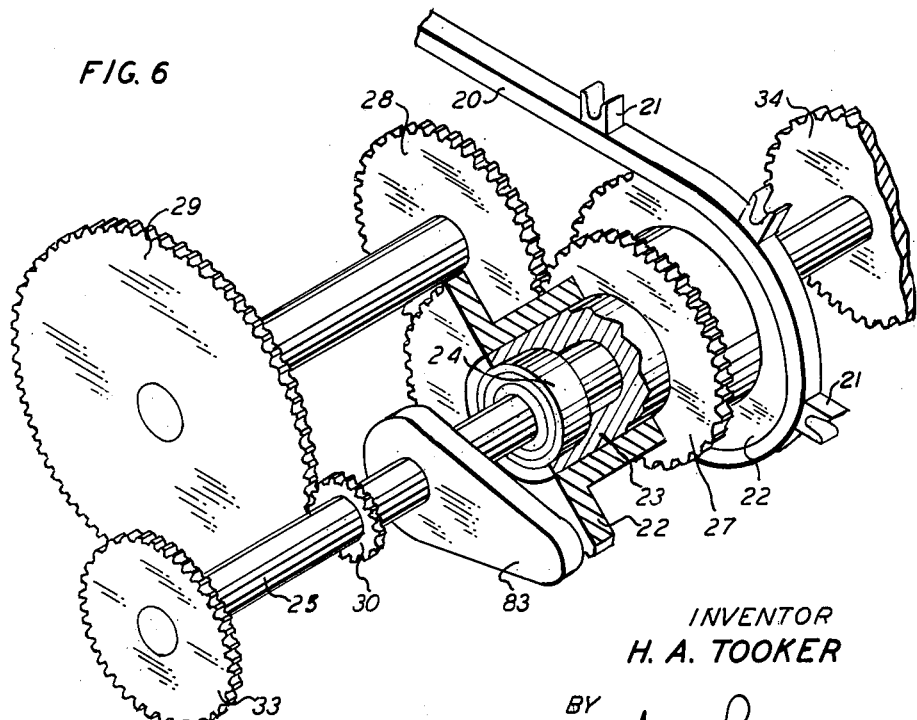
Fig. 6 is a fragmentary isometric view of the driving mechanism for the apparatus.

Referring now to the drawings, attention is first directed to Fig. 1 which illustrates one embodiment of the invention including a housing 10 for the apparatus including drawers or trays 11, 12 and 14 to receive the electrical units resulting from tests thereon when they are included in a testing unit indicated generally at 15. While the details of the testing unit form no part of this invention, the unit may be of the type shown in application Serial Number 258,485, filed November 27, 1951. Fig. 1 also illustrates a bench 16 supporting a longitudinally extending housing 17 for the conveyor belts, the upper portion of the housing being open to allow access to the belts for loading the units on the conveyor belts so that they may travel toward the testing unit 15.

In the present embodiment of the invention the electrical unit 18, Figs. 2 to 6 inclusive, to be tested has aligned wire-like terminals 19 of given lengths extending from both ends of the unit. The conveyor belts 20, disposed at spaced positions as shown in Fig. 2, are provided with equally spaced pairs of notched supports 21 on the outer surfaces of the belts to receive the terminals 19 of the units 18 to be tested. The conveyor belts 20 travel over suitably positioned pairs of sprockets only the driven pair 22 being shown in the drawings. The sprockets 22 are fixedly mounted on a hollow shaft 23, Fig. 6, supported by bearings 24 positioned in the ends of the hollow shaft and mounted on a drive shaft 25. The hollow shaft 23, although free to rotate with the sprockets on the drive shaft 25, is connected to the drive shaft through a train of gears 27, 28, 29 and 30 so that there will be a definite ratio between the drive shaft and the sprockets such as six to one depending on the sizes of the sprockets and the spacing of the notched supports 21.

The drive shaft 25 is mounted in suitable bearings 32, Fig. 2, with sprockets 33 and 34 mounted on the outer ends of the shaft. The sprocket 33 is connected by a chain 36 to a suitable power means, such as an electrical motor, to be driven thereby at a constant rate of speed. The sprocket 34 drives a chain 38 to drive a sprocket 39 which is mounted on a cam shaft 40. The cam shaft 40 is journaled in suitable bearings 41 and has cams 42, 43, 44, 45 and 46 mounted thereon. The cams 42—43 and 45—46 function in controlling the testing circuits of the aforementioned co-pending application.

The cam 44, shown in Figs. 2 and 3, is positioned to engage the upper portion of a holding element 50 which is provided with an elongate aperture 51 of a given contour to receive the adjacent portion of the cam 44 to release the element for movement into holding position through combined forces of springs 52. The springs 52 are positioned upon each side of the element 50 concentric with a shaft 53 having its ends supported in suitable bearings 54 and extending through an aperture in the central portion of the element. Legs 55 of the element 50 extending downwardly at parallel spaced positions have insulating members 56 secured near their lower ends to engage the terminals 19 of the electrical units 18 being tested. When the element 50 is released by the cam 44 the springs 52 urge the legs 55 counter-clockwise to force the terminals 19 into close engagement with contacts 57 of switches 58 which are included in the testing unit 15 as illustrated schematically in Fig. 4. Each unit is held with its terminal engaging the contacts during actuation of the cams 42—43 and 45—46 to operate their respective switches 62, 63, 65 and 66 at given intervals of time to complete the tests on each unit.

The mechanism Fig. 3 for transferring the electrical units 18 successively from the conveyor to a position adjacent the contacts includes spaced units indicated generally at 70 positioned upon each side of the conveyors adjacent the sprockets 22. Transfer members 71 of these units have portions 72, with outer surfaces partially conforming to the contours of their respective conveyor belts as they travel about the sprockets 22, and shelf-like portions 73 against which the terminals 19 of the successive articles rest. The members 71 of each unit are secured at 75 to parallel sleeves 76 which are slidably disposed in bushings 77 of a housing 78. Springs 79 secured at like ends to adjustable members 80, extend through the parallel sleeves 76 where their other ends are secured to normally urge the transfer members 71 to the position shown in Fig. 5. However, rollers 82 carried by the members 71 of the units are positioned to be engaged by cams 83 which are fixed to and driven by the drive shaft 25.

Considering now the operation of the apparatus, let it be assumed that the driving means for the drive shaft 25 is operating continuously at a constant rate of speed, driving the shaft 25 six revolutions for every one revolution of the sprockets 22. If the electrical units 18 are located with their terminals resting in the holders 21, they will be advanced toward the contacts 57 of the testing unit 15 at a rate of speed permitting the introduction of the units into the testing circuits and holding them until the necessary tests have been completed prior to the positioning of the next unit into the transferring position. When the next unit to be tested reaches a transferring position, the transfer members 71 are in the positions shown in Fig. 5. The cams 83 at this time are ready to move against their cam rollers 82 to force the transfer members outwardly against the forces of their springs 79 in paths guided by the movement of the sleeves 76 in the bushings 77 to locate the next unit to be tested adjacent the contacts 57. During this movement of the transfer members, the portions 73 act as shelves for the terminals 19, permitting the element 50 to move the terminals into engagement with the contacts 57 when the element is released by the cam 44.

In both Figs. 2 and 3 the cam 44 is shown extending through the aperture 51 of the element 50. It will be apparent, however, that during rotation of the cam 44 it will engage the uppermost portion of the element 50, forcing the element in a blockwise direction Fig. 3 about the axis of the shaft 53 thus forcing the legs 55 away from the contacts 57 where the element will remain in this open position during outward movement of the transfer members 71. The timed relation in the operation of the cams 44 and 83 permits transferring of the electrical units to positions adjacent the contacts by the transfer members 71 while the element 50 is held open and prior to the return movement of the transfer elements. When the cam 44 enters the aperture 51 the springs 52 are free to function to force the legs 55 or the insulating portions 56 thereof into engagement with the terminals 19 and to hold them firmly in engagement with the contacts of the switches 58.

The element of time for the various tests to be made on the successive electrical units is determined by the cams 42—43 and 45—46, operating the switches 62—63 and 65—66 connecting the contacts with the unit 18 in the testing circuits.

When the tested units are released, they are allowed to drop down a passageway having gates, such as 91, positioned according to the results of the tests to cause the tested unit to pass into the proper one of the trays 11, 12 or 14.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for use in testing electrical units having substantially aligned terminals extending from opposing sides of the units, the apparatus comprising contacts mounted at spaced positions and included in a circuit with an electrical testing means, spaced parallel conveyors having aligned pairs of supports for the terminals of the units mounted at spaced positions thereon, companion members normally disposed in the paths of the terminals of the units, means to actuate the companion members simultaneously to remove the terminals of the successive units from their pairs of supports on the conveyors and position them singly adjacent their contacts, an element having insulated leg portions positioned to engage the terminals mounted for movement relative to the contacts, and means to normally urge the element to cause the leg portions to engage the terminals of the units while held singly by the companion members, move them into engagement with the contacts, hold them in engagement with the contacts during testing of the units and a cam actuable to move the element to free the tested unit and hold the legs of the element away from the contacts until the next unit is positioned with its contacts adjacent the contacts.

2. An apparatus for use in testing electrical units having aligned terminals extending from opposite ends thereof, contacts mounted at spaced positions and included in a test circuit, spaced conveyors having aligned pairs of notched supports disposed at spaced positions to receive the aligned terminals and thereby support the terminals and their units, means to drive the conveyors to advance the units with their terminals toward the contacts successively, and a transfer member with spaced arms actuable to cause the arms to engage their respective terminals of the successive units, remove them from their notch supports and move them laterally toward the contacts.

3. An apparatus for use in testing electrical units having aligned terminals extending from opposite ends thereof, contacts mounted at spaced positions and included in a test circuit, spaced conveyors having aligned pairs of notched supports disposed at spaced positions to receive the aligned terminals and thereby support the terminals and their units, means to drive the conveyors to advance the units with their terminals toward the contacts successively, a transfer member with spaced arms actuable to cause the arms to engage their respective terminals of the successive units, remove them from their notch supports and move them laterally toward the contacts, and an element actuable while the terminals are held by the arms adjacent the contacts to engage the terminals, force them laterally into close engagement with their contacts and hold them so positioned during testing of the units.

4. An apparatus for use in testing electrical units having aligned terminals extending from opposite ends thereof, contacts mounted at spaced positions and included in a test circuit, spaced conveyors having aligned pairs of notched supports disposed at spaced positions to receive the aligned terminals and thereby support the terminals and their units, means to drive the conveyors to advance the units with their terminals toward the contacts successively, a transfer member with spaced arms actuable to cause the arms to engage their respective terminals of the successive units, remove them from their notch supports and move them laterally toward the contacts, an element actuable while the terminals are held by the arms adjacent the contacts to engage the terminals, force them laterally into close engagement with their contacts and hold them so positioned during testing of the units, and means actuable subsequent to the test to move the element away from the contacts to free the terminals from the contacts.

5. An apparatus for use in testing electrical units having aligned terminals extending from opposite ends thereof, contacts mounted at spaced positions and included in a test circuit, spaced conveyors having aligned pairs of notched supports disposed at spaced positions to receive the aligned terminals and thereby support the terminals and their units, means to drive the conveyors to advance the units with their terminals toward the contacts successively, a transfer member with spaced arms having their outer ends recessed to receive and support the terminals of the successive units, and means actuable to cause the recessed arms to remove the terminals of the successive units from their notched supports and move them laterally toward the contacts.

6. An apparatus for use in testing electrical units having aligned terminals extending from opposite ends thereof, contacts mounted at spaced positions and included in a test circuit, spaced conveyors having aligned pairs of notched supports disposed at spaced positions to receive the aligned terminals and thereby support the terminals and their units, means to drive the conveyors to advance the units with their terminals toward the contacts successively, a transfer member with spaced arms having their outer ends recessed to receive and support the terminals of the successive units, means actuable to cause the recessed arms to remove the terminals of the successive units from their notched supports and move them laterally toward the contacts, and an element actuable while the terminals are supported in the recessed ends of the arms to engage the terminals, force them laterally into close engagement with the contacts and hold them so positioned during testing of the units.

7. An apparatus for use in testing electrical units having aligned terminals extending from opposite ends thereof, contacts mounted at spaced positions and included in a test circuit, spaced conveyors having aligned pairs of notched supports disposed at spaced positions to receive the aligned terminals and thereby support the terminals and their units, means to drive the conveyors to advance the units with their terminals toward the contacts successively, a transfer member with spaced arms having their outer ends recessed to receive and support the terminals of the succesive units, means actuable to cause the recessed arms to remove the terminals of the successive units from their notched supports and move them lateraly toward the contacts, an element actuable while the terminals are supported in the recessed ends of the arms to engage the terminals, force them laterally into close engagement with the contacts and hold them so positioned during testing of the units, and means actuable subsequent to the test to move the element away from the contacts to free the terminals from the contacts.

References Cited in the file of this patent

UNITED STATES PATENTS

| | | |
|---|---|---|
| 1,254,690 | Hazard | Jan. 29, 1918 |
| 1,768,449 | Heiny | June 24, 1930 |
| 2,016,455 | Purdy | Oct. 8, 1935 |
| 2,362,691 | Gaiser | Nov. 14, 1944 |
| 2,468,843 | Sunstein | May 3, 1949 |